United States Patent
Robinson et al.

(10) Patent No.: US 12,240,996 B2
(45) Date of Patent: Mar. 4, 2025

(54) CURABLE PHOTOCHROMIC COMPOSITION INCLUDING A SEGMENTED POLYMER

(71) Applicant: Transitions Optical, Ltd., Tuam (IE)

(72) Inventors: Stephen G. Robinson, Murrysville, PA (US); Cathy A. Taylor, Allison Park, PA (US)

(73) Assignee: Transitions Optical, Ltd., Tuam (IE)

( * ) Notice: Subject to any disclaimer, the term of this patent is extended or adjusted under 35 U.S.C. 154(b) by 461 days.

(21) Appl. No.: 17/789,050

(22) PCT Filed: Dec. 27, 2019

(86) PCT No.: PCT/EP2019/087070
§ 371 (c)(1),
(2) Date: Jun. 24, 2022

(87) PCT Pub. No.: WO2021/129941
PCT Pub. Date: Jul. 1, 2021

(65) Prior Publication Data
US 2023/0048395 A1   Feb. 16, 2023

(51) Int. Cl.
| | | |
|---|---|---|
| C09D 5/29 | (2006.01) | |
| C08G 18/22 | (2006.01) | |
| C08G 18/40 | (2006.01) | |
| C08G 18/44 | (2006.01) | |
| C08G 18/62 | (2006.01) | |
| C08G 18/73 | (2006.01) | |
| C08K 5/1545 | (2006.01) | |
| C09D 7/41 | (2018.01) | |
| C09D 175/04 | (2006.01) | |
| C09K 9/02 | (2006.01) | |

(52) U.S. Cl.
CPC .............. *C09D 5/29* (2013.01); *C08G 18/227* (2013.01); *C08G 18/4063* (2013.01); *C08G 18/44* (2013.01); *C08G 18/6279* (2013.01); *C08G 18/73* (2013.01); *C08K 5/1545* (2013.01); *C09D 7/41* (2018.01); *C09D 175/04* (2013.01); *C09K 9/02* (2013.01); *C09K 2211/1007* (2013.01); *C09K 2211/1018* (2013.01)

(58) Field of Classification Search
CPC .......... C09D 5/29; C09D 7/41; C09D 175/04; C08G 18/44; C08G 18/73; C08G 18/227; C08G 18/4063; C08G 18/6279; C08K 5/1545; C09K 9/02; C09K 2211/1007; C09K 2211/1018
See application file for complete search history.

(56) References Cited

U.S. PATENT DOCUMENTS

| | | |
|---|---|---|
| 4,345,057 A | 8/1982 | Yamabe et al. |
| 5,645,767 A | 7/1997 | Van Gemert |
| 5,658,501 A | 8/1997 | Kumar et al. |
| 5,777,061 A | 7/1998 | Yonek et al. |
| 5,962,617 A | 10/1999 | Slagel |
| 6,187,444 B1 | 2/2001 | Bowles, III et al. |
| 8,608,988 B2 | 12/2013 | Bowles et al. |
| 9,028,728 B2 | 5/2015 | Bancroft et al. |
| 10,254,617 B2 | 4/2019 | Gauthier et al. |
| 10,954,397 B2 | 3/2021 | Haley et al. |
| 2015/0152322 A1* | 6/2015 | Nakayama ............... C08K 9/10 428/402 |
| 2020/0172653 A1 | 6/2020 | Robinson et al. |

FOREIGN PATENT DOCUMENTS

| | | |
|---|---|---|
| WO | 2017030545 A1 | 2/2017 |
| WO | 2019029794 A1 | 2/2019 |

* cited by examiner

*Primary Examiner* — Bijan Ahvazi
(74) *Attorney, Agent, or Firm* — The Webb Law Firm

(57) ABSTRACT

The present invention is directed to a curable photochromic composition including (a) a photochromic compound; (b) a segmented polymer having active hydrogen groups, at least one first segment, and at least one second segment, wherein (i) each first segment independently includes a fluorinated polymer segment, and (ii) each second segment independently includes a segment selected from a polycarbonate segment, a polyester segment, a polyether segment, a polyurethane segment, and a segment of copolymers thereof; and (c) a curing agent having reactive functional groups that are reactive with the active hydrogen groups of the segmented polymer, wherein the curing agent includes at least one of a polyisocyanate, a polyisothiocyanate, or an aminoplast. Also provided are photochromic films and articles, including multilayer articles, which include the curable photochromic composition.

18 Claims, No Drawings

CURABLE PHOTOCHROMIC COMPOSITION INCLUDING A SEGMENTED POLYMER

CROSS-REFERENCE TO RELATED APPLICATION

This application is the United States national phase of International Application No. PCT/EP2019/087070 filed Dec. 27, 2019, the disclosure of which is hereby incorporated by reference in its entirety.

BACKGROUND OF THE INVENTION

Field of the Invention

The present invention relates to curable photochromic compositions, which include a photochromic compound, a segmented polymer that includes at least one first segment, and at least one second segment, and a curing agent. Photochromic articles prepared from such compositions are also provided.

Description of Related Art

In response to certain wavelengths of electromagnetic radiation (or "actinic radiation"), photochromic compounds, such as indeno-fused naphthopyrans, typically undergo a transformation from one form or state to another form, with each form having a characteristic or distinguishable absorption spectrum associated therewith. Typically, upon exposure to actinic radiation, many photochromic compounds are transformed from a closed-form, which corresponds to an unactivated (or bleached, e.g., substantially colorless) state of the photochromic compound, to an open-form, which corresponds to an activated (or colored) state of the photochromic compound. In the absence of exposure to actinic radiation, such photochromic compounds are reversibly transformed from the activated (or colored) state, back to the unactivated (or bleached) state. Compositions and articles, such as optical lenses, that contain photochromic compounds or have photochromic compounds applied thereto (e.g., in the form of a photochromic coating composition) typically display colorless (e.g., clear) and colored states that correspond to the colorless and colored states of the photochromic compounds contained therein or applied thereto.

Photochromic compounds can be used in curable compositions to form, for example, cured layers, such as cured films or sheets that are photochromic. With cured photochromic films, such as cured photochromic coatings, it is typically desirable that they provide a combination of hardness and photochromic performance. Generally, the kinetics associated with the reversible transformation of a photochromic compound between a closed-form (unactivated/colorless) and an open-form (activated/colored) is faster in a soft matrix, but slower in a hard matrix (of the cured film in which the photochromic compound resides). Cured photochromic films having a soft matrix typically have reduced hardness, while those having a hard matrix typically have increased hardness. Pre-polymer resins often show improvements in hardness and dye kinetics, but are more sensitive to dye fatigue, or dye degradation.

It would be desirable to develop curable photochromic compositions that provide cured photochromic layers having acceptable hardness, improved kinetics, and improved dye fatigue.

SUMMARY OF THE INVENTION

The present invention is directed to a curable photochromic composition comprising:
(a) a photochromic compound;
(b) a segmented polymer comprising active hydrogen groups, at least one first segment, and at least one second segment, wherein:
  (i) each first segment independently comprises a fluorinated polymer segment, and
  (ii) each second segment independently comprises a segment selected from the group consisting of a polycarbonate segment, a polyester segment, a polyether segment, a polyurethane segment, and a segment of copolymers thereof; and
(c) a curing agent comprising reactive functional groups that are reactive with the active hydrogen groups of the segmented polymer, wherein the curing agent comprises at least one of a polyisocyanate, a polyisothiocyanate, or an aminoplast.

The present invention also provides photochromic films and articles, including multilayer articles which comprise the curable photochromic composition.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DESCRIPTION OF THE INVENTION

As used herein, the articles "a", "an", and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about".

As used herein, "at least one of" is synonymous with "one or more of", whether the elements are listed conjunctively or disjunctively. For example, the phrases "at least one of A, B, and C" and "at least one of A, B, or C" each mean any one of A, B, or C, or any combination of any two or more of A, B, or C. For example, A alone; or B alone; or C alone; or A and B; or A and C; or B and C; or all of A, B, and C.

As used herein, "selected from" is synonymous with "chosen from" whether the elements are listed conjunctively or disjunctively. Further, the phrases "selected from A, B, and C" and "selected from A, B, or C" each mean any one of A, B, or C, or any combination of any two or more of A, B, or C. For example, A alone; or B alone; or C alone; or A and B; or A and C; or B and C; or all of A, B, and C.

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester", means methacrylates and/or acrylates. As used herein, the term "(meth) acrylic acid" means methacrylic acid and/or acrylic acid.

As used herein, the term "photochromic" and similar terms, such as "photochromic compound", means having an absorption spectrum for at least visible radiation that varies in response to absorption of at least actinic radiation. Further, as used herein, the term "photochromic material" means any substance that is adapted to display photochromic properties (such as adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state", to a second state, for example a "colored state", in response to actinic radiation, and reverting back to the first state in response to thermal energy. The term "non-thermally reversible photochromic compounds/materials" as used herein means compounds/materials capable of converting from a first state, for example a "clear state", to a second state, for example a "colored state", in response to actinic radiation, and reverting back to the first state in response to actinic radiation of substantially the same wavelength(s) as the absorption(s) of the colored state.

As used herein to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, the photochromic compounds of the present invention can have a different absorption spectrum in each of the first and second states. For example, while not limiting herein, a photochromic compound of the present invention can be clear in the first state and colored in the second state. Alternatively, a photochromic compound of the present invention can have a first color in the first state and a second color in the second state.

As used herein, the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein, the term "display" means the visible or machine-readable representation of information in words, numbers, symbols, designs or drawings. Non-limiting examples of display elements include screens, monitors, and security elements, such as security marks.

As used herein, the term "window" means an aperture adapted to permit the transmission of radiation therethrough. Non-limiting examples of windows include automotive and aircraft transparencies, windshields, filters, shutters, and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, spatial or directional terms, such as "left", "right", "inner", "outer", "above", "below", and the like, relate to various orientations of the invention as may be described further herein, such as articles and multilayer articles of the present invention. It is to be understood, however, that the invention can assume various alternative orientations to those described herein and, accordingly, such terms are not to be considered as limiting.

As used herein, the terms "formed over", "deposited over", "provided over", "applied over", "residing over", or "positioned over" mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include a methylene group or a methyl group; groups that are linear, such as linear $C_2$-$C_{20}$ alkyl groups; and groups that are appropriately branched, such as branched $C_3$-$C_{20}$ alkyl groups.

As used herein, recitations of "optionally substituted" group, means a group, including but not limited to, alkyl group, cycloalkyl group, heterocycloalkyl group, aryl group, and/or heteroaryl group, in which at least one hydrogen thereof has been optionally replaced or substituted with a group that is other than hydrogen, such as, but not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, alkyl groups (including aralkyl groups); alkenyl groups; alkynyl groups; haloalkyl groups; perhaloalkyl groups; heterocycloalkyl groups; aryl groups (including alkaryl groups, including hydroxyl substituted aryl, such as phenol, and including poly-fused-ring aryl); heteroaryl groups (including poly-fused-ring heteroaryl groups); or amine groups, such as —N($R_{11}$')($R_{12}$') where $R_{11}$' and $R_{12}$' are each independently selected from hydrogen, linear or branched $C_1$-$C_{20}$ alkyl, $C_3$-$C_{12}$ cycloalkyl, $C_3$-$C_{12}$ heterocycloalkyl, aryl, or heteroaryl.

As used herein, recitations of "halo substituted" and related terms (such as, but not limited to, haloalkyl groups, haloalkenyl groups, haloalkynyl groups, haloaryl groups and halo-heteroaryl groups) means a group in which at least one, and up to and including all of the available hydrogen groups thereof is substituted with a halo group. The term "halo-substituted" is inclusive of "perhalo-substituted". As used herein, the term perhalo-substituted group and related terms (such as, but not limited to, perhaloalkyl groups, perhaloalkenyl groups, perhaloalkynyl groups, perhaloaryl groups and perhalo-heteroaryl groups) means a group in which all of the available hydrogen groups thereof are substituted with a halo group. For example, perhalomethyl is —$CX_3$; perhalophenyl is —$C_6X_5$, where X represents one or more halo groups, such as but not limited to F.

Representative alkyl groups include, but are not limited to, methyl, ethyl, propyl, isopropyl, butyl, isobutyl, sec-butyl, tert-butyl, pentyl, neopentyl, hexyl, heptyl, octyl, nonyl and decyl. Representative alkenyl groups include, but are not limited to, vinyl, allyl and propenyl. Representative alkynyl groups include, but are not limited to, ethynyl, 1-propynyl, 2-propynyl, 1-butynyl, and 2-butynyl. Representative cycloalkyl groups include, but are not limited to, cyclopropyl, cyclobutyl, cyclopentyl, cyclohexyl, and cyclooctyl substituents. Representative heterocycloalkyl groups include, but are not limited to, imidazolyl, tetrahydrofuranyl, tetrahydropyranyl and piperidinyl. Representative aryl groups include, but are not limited to, phenyl, naphthyl, anthracynyl and triptycenyl. Representative heteroaryl groups include, but are not limited to, furanyl, pyranyl, pyridinyl, isoquinoline, and pyrimidinyl. Representative aralkyl groups include, but are not limited to, benzyl, and phenethyl.

The term "alkyl" as used herein, means linear or branched alkyl, such as but not limited to linear or branched $C_1$-$C_{25}$ alkyl, or linear or branched $C_1$-$C_{10}$ alkyl, or linear or branched $C_2$-$C_{10}$ alkyl. Examples of alkyl groups from which the various alkyl groups of the present invention can be selected from, include, but are not limited to, those recited previously herein. The term "cycloalkyl" as used herein means groups that are appropriately cyclic, such as but not limited to, $C_3$-$C_{12}$ cycloalkyl (including, but not limited to, cyclic $C_5$-$C_7$ alkyl) groups. Examples of cycloalkyl groups include those recited previously herein. The term "cycloalkyl" as used herein also includes: bridged ring polycycloalkyl groups (or bridged ring polycyclic alkyl groups), such as but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "heterocycloalkyl" as used herein means groups that are appropriately cyclic, such as but not limited to $C_3$-$C_{12}$ heterocycloalkyl groups or $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, those recited previously herein. The term "heterocycloalkyl" as used herein also includes: bridged ring polycyclic heterocycloalkyl groups, such as but not limited to 7-oxabicyclo[2.2.1]heptanyl; and fused ring polycyclic heterocycloalkyl groups, such as but not limited to octahydrocyclopenta[b]pyranyl, and octahydro-1H-isochromenyl.

The term "heteroaryl", as used herein, includes but is not limited to $C_5$-$C_{15}$ heteroaryl, such as but not limited to $C_5$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups include, but are not limited to, those recited previously herein. The term "aralkyl", as used herein, includes but is not limited to $C_6$-$C_{24}$ aralkyl, such as but not limited to $C_6$-$C_{10}$ aralkyl, and means an aryl group substituted with an alkyl group. Examples of aralkyl groups include, but are not limited to, those recited previously herein. As previously mentioned, the curable photochromic compositions of the present invention include a segmented polymer (b) having active hydrogen groups. The segmented polymer (b) includes (i) at least one first segment; and (ii) at least one second segment. Either or both of the (i) at least one first segment and (ii) the at least one second segment can comprise active hydrogen groups as discussed in detail below.

Each of the at least one first segment(s) (i) independently comprises a fluorinated polymer segment. Suitable examples of fluorinated polymers from which the fluorinated polymer segment is derived can include, but are not limited to, fluoroethylene-alkyl vinyl ether alternating copolymers (such as those described in U.S. Pat. No. 4,345,057) available from Asahi Glass Company under the name LUMIFLON; and fluoroaliphatic polymeric esters commercially available from 3M of St. Paul, Minnesota under the name FLUORAD.

The fluorinated polymer segment (i) can include active hydrogen groups such as any of the active hydrogen groups mentioned herein below, e.g., hydroxyl groups. Generally, the first segment (i) is present in the segmented polymer (b) in an amount of from 5 percent by weight to 70 percent by weight, such as from 5 percent by weight to 60 percent by weight, such as from 8 percent by weight to 55 percent by weight, based on total weight of the segment polymer.

Further, the first segment (i) can comprise from 2 percent by weight to 40 percent by weight of the curable photochromic composition, such as from 2 percent by weight to 30 percent by weight, based on the weight of total solids present in the curable photochromic composition.

The segmented polymer (b) of the curable photochromic compositions of the present invention, further includes at least one second segment (ii), in which each second segment independently includes at least one of a polycarbonate segment, a polyester segment, a polyether segment, a polyurethane segment, combinations of two or more thereof, or copolymers of two or more thereof.

The at least one second segment (ii) can be terminated with a group derived from (i.e., a group which is the residue of) an active hydrogen-containing compound. Suitable active hydrogen-containing compounds include art-recognized capping agents (such as one or more of the capping agents described herein below with regard to the capped polyisocyanate curing agent).

Each polycarbonate segment of each second segment of the segmented polymer can independently be prepared in accordance with art-recognized methods. For purposes of non-limiting illustration, each polycarbonate segment can independently be prepared from the reaction of a polyol, such as a diol, with a carbonyl dihalide, such as carbonyl dichloride, with removal of the resulting halide acid, such as HCl. For purposes of further non-limiting illustration, each polycarbonate segment can independently be prepared from a transesterification reaction of a polyol, such as a diol, and a dihydrocarbyl carbonate, such as diphenyl carbonate, with removal of the resulting hydroxyl functional hydrocarbyl, such as phenol.

Examples of polyols having at least two hydroxyl groups, from which each polycarbonate segment can be independently prepared, include, but are not limited to, glycerin, trimethylolpropane, trimethylolethane, trishydroxyethylisocyanurate, pentaerythritol, ethylene glycol, propylene glycol, trimethylene glycol, 1,3-, 1,2- and 1,4-butanediols, pentane diols (such as, but not limited to, 1,5-pentane diol), heptanediol, hexanediol, octanediol, 4,4'-(propane-2,2-diyl) dicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, 4,4'-methylenediphenol, and like polyols.

Each polycarbonate segment of each second segment can independently be free of active hydrogen functionality, or include one or more active hydrogen functional groups each independently selected from hydroxyl, thiol, primary amine, or secondary amine. Active hydrogen functionality can be independently introduced into each polycarbonate segment during formation thereof, or after formation thereof, in accordance with art-recognized methods. With some embodiments, at least some of the polycarbonate segments have hydroxyl functionality. Polycarbonate segments having hydroxyl functionality can, with some embodiments, be prepared from polycarbonate polyols, such as polycarbonate diols. Polycarbonate polyols, such as polycarbonate diols, can, with some further embodiments, be selected from commercially available polycarbonate polyols, such as, but not limited to, ETERNACOLL polycarbonate diols from UBE Industries.

Each polycarbonate segment of each second segment, can have any suitable molecular weight. For example, each polycarbonate segment of each second segment, independently can have an Mn of less than 20,000, such as less than 15,000. Each polycarbonate segment of each second segment can have an Mn greater than 3,000, such as 3,000 to 20,000, or such as 3,000 to 15,000.

Each polyester segment of the each second segment of the segmented polymer can independently be prepared in accordance with art-recognized methods. For purposes of non-limiting illustration, each polyester segment independently can be prepared by reacting carboxylic acid functional materials (and/or cyclic anhydrides thereof, and/or esters thereof) having carboxylic acid functionalities (or effective carboxylic acid functionalities, such as in the case of cyclic anhydrides and carboxylic acid esters) of at least 2, and polyols having hydroxy functionalities of at least 2. The molar equivalents ratio of carboxylic acid groups to hydroxy groups of the reactants is selected such that the resulting polyester segment has hydroxyl functionality and/or carboxylic acid functionality, and a desired molecular weight.

Examples of multifunctional carboxylic acids useful in preparing each polyester segment include, but are not limited to, phthalic acid, tetrahydrophthalic acid, hexahydrophthalic acid, endobicyclo-2,2,1,5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, adipic acid, sebacic acid, and like multifunctional carboxylic acids (optionally including appropriate cyclic anhydrides thereof and/or esters thereof).

Examples of polyols that can be used to prepare each polyester segment of the second segment include, but are not limited to, those polyol examples recited previously herein.

Each polyester segment of each second segment can independently be free of active hydrogen functionality, or include one or more active hydrogen functional groups each independently selected from hydroxyl, thiol, primary amine, or secondary amine. Active hydrogen functionality can be independently introduced into each polyester segment during formation thereof, or after formation thereof, in accordance with art-recognized methods.

Each polyester segment of each second segment, can have any suitable molecular weight. For example, each polyester segment of each second segment, independently can have a Mn of less than 20,000, such as less than 15,000. Each polyester segment of each second segment can have an Mn greater than 3,000, such as 3,000 to 20,000, or such as 3,000 to 15,000.

Each polyether segment of the each second segment of the segmented polymer can independently be prepared in accordance with art-recognized methods. For purposes of non-limiting illustration, each polyether segment independently can be prepared from the reaction of polyols having two or more hydroxy groups and polyepoxides having two or more epoxide (or oxirane) groups, which are reacted in proportions such that the resulting polyether has hydroxy functionality and/or oxirane functionality. The polyols and polyepoxides used in the preparation of the polyether segment can be selected from, for example, aliphatic, cycloaliphatic or aromatic polyols or polyepoxides, or mixtures thereof. Specific examples of polyols include those recited previously herein. Polyepoxides useful in preparing the polyether segments can include those resulting from the reaction of a polyol and epichlorohydrin. One or more of the polyols recited previously herein can be reacted with epichlorohydrin, so as to result in the formation of a polyepoxide. For purposes of non-limiting illustration, each polyether segment independently can be prepared from: 4,4'-(propane-2,2-diyl)diphenol and the diglycidyl ether of 4,4'-(propane-2,2-diyl)diphenol; or 4,4'-(propane-2,2-diyl)dicylcohexanol and the diglycidyl ether of 4,4'-(propane-2,2-diyl)dicylcohexanol.

Each polyether segment of each second segment can independently be free of active hydrogen functionality, or include one or more active hydrogen functional groups each independently selected from hydroxyl, thiol, primary amine, or secondary amine. Active hydrogen functionality can be independently introduced into each polyether segment during formation thereof, or after formation thereof, in accordance with art-recognized methods.

Each polyether segment of each second segment, can have any suitable molecular weight. For example, each polyether segment of each second segment, independently can have an Mn of less than 20,000, such as less than 15,000. Each polyether segment of each second segment can have an Mn greater than 3,000, such as 3,000 to 20,000, or such as 3,000 to 15,000.

Each polyurethane segment of each second segment of the segmented polymer can independently be prepared in accordance with art-recognized methods. For purposes of non-limiting illustration, each polyurethane segment independently can be prepared from the reaction of a polyisocyanate having at least two isocyanate groups with a polyol having at least two hydroxy groups, with an appropriate molar excess of hydroxyl groups, so as to form a hydroxyl functional polyurethane having at least 2 hydroxyl groups; or an appropriate molar excess of isocyanate groups so as to form a polyurethane having at least 2 isocyanate groups. Examples of polyisocyanates useful in the preparation of polyurethane segments include, but are not limited to, aliphatic, aromatic, cycloaliphatic and heterocyclic polyisocyanates, and mixtures of such polyisocyanates.

Further examples of polyisocyanates useful in the preparation of polyurethane segments include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; 2,4,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; norbornane diisocyanate; and mixtures thereof.

Examples of polyols having at least two hydroxyl groups, from which the polyurethane segments of the second segment can be prepared, include, but are not limited to, those polyols recited previously herein.

Each polyurethane segment of each second segment can independently be free of active hydrogen functionality, or include one or more active hydrogen functional groups each independently selected from hydroxyl, thiol, primary amine, or secondary amine. Active hydrogen functionality can be independently introduced into each polyurethane segment during formation thereof, or after formation thereof, in accordance with art-recognized methods.

Each polyurethane segment of each second segment, can have any suitable molecular weight. For example, each polyurethane segment of each second segment, independently can have a Mn of less than 20,000, such as less than 15,000. Each polyurethane segment of each second segment can have an Mn greater than 3,000, such as 3,000 to 20,000, or such as 3,000 to 15,000.

Each second segment, of the segmented polymers of the curable compositions of the present invention, independently can include at least one of a polycarbonate segment, a polycarbonate-polyester segment, a polycarbonate-polyurethane segment, a polyether-polyurethane segment, or a polycarbonate-polyester-polyurethane segment. Each second segment may comprise combinations of polyols chain extended with difunctional linkers for example but not limited to dicarboxylic acids to give ester linkages or bischloroformates to give carbonate linkages or diisocyanates to give urethane linkages or diols to give ether linkages or combinations of ester and urethane linkages such that the second segment has a final Mn of less than 20,000 and greater than 3,000, such as from 3,000 to 15,000.

Each polycarbonate-polyester segment of each second segment of the segmented polymer can independently be prepared in accordance with art-recognized methods. For purposes of non-limiting illustration, each polycarbonate-polyester segment independently can be prepared in accordance with the description provided previously herein with regard to the preparation of a polyester segment, in which at least some of the polyols are polycarbonate polyols. The polycarbonate polyols can be prepared in accordance with the description provided previously herein with regard to the preparation of a polycarbonate segment, with the molar ratios of the reactants adjusted such that the resulting polycarbonate has hydroxyl functionality, and correspondingly is a polycarbonate polyol.

Each polycarbonate-polyurethane segment of each second segment of the segmented polymer can independently be prepared in accordance with art-recognized methods. For purposes of non-limiting illustration, each polycarbonate-polyurethane segment independently can be prepared in accordance with the description provided previously herein with regard to the preparation of a polyurethane segment, in which at least some of the polyols are polycarbonate polyols. The polycarbonate polyols can be prepared in accordance with the description provided previously herein with regard to the preparation of a polycarbonate segment, with the molar ratios of the reactants adjusted such that the resulting polycarbonate has hydroxyl functionality, and correspondingly is a polycarbonate polyol.

Each polyether-polyurethane segment of each second segment of the segmented polymer independently can be prepared in accordance with art-recognized methods. For purposes of non-limiting illustration, each polyether-polyurethane segment independently can be prepared in accordance with the description provided previously herein with regard to the preparation of a polyurethane segment, in which at least some of the polyols are polyether polyols. The polyether polyols can be prepared in accordance with the description provided previously herein with regard to the preparation of a polyether segment, with the molar ratios of the reactants adjusted such that the resulting polyether has hydroxyl functionality, and correspondingly is a polyether polyol.

Each polycarbonate-polyester-polyurethane segment of each second segment of the segmented polymer can independently be prepared in accordance with art-recognized methods. For purposes of non-limiting illustration, each polycarbonate-polyester-polyurethane segment can independently be prepared in accordance with the description provided previously herein with regard to the preparation of a polyurethane segment, in which at least some of the polyols are polycarbonate-polyester polyols. The polycarbonate-polyester polyols can be prepared in accordance with the description as provided previously herein, in which the molar ratio of reactants is adjusted such that the resulting polymer has hydroxyl functionality, and correspondingly is a polycarbonate-polyester polyol.

Generally, the second segment (ii) is present in the segmented polymer (b) in an amount of from 30 percent by weight to 95 percent by weight, such as from 40 percent by weight to 95 percent by weight, such as from 45 percent by weight to 92 percent by weight, based on total weight of the segment polymer. Further, the second segment (ii) comprises from 15 percent by weight to 70 percent by weight, such as 20 to 60 percent by weight, or such as 22 to 55 percent by weight, of the curable photochromic composition, based on the total solids weight present in the curable photochromic composition. The total solids weight of the curable photochromic composition does not include the weight of any volatile components, such as solvents, and includes the weight of non-volatile components, including the photochromic compound(s); the segmented polymer; the curing agent; and any optional non-volatile additives, such as, but not limited to, ultraviolet light stabilizers, heat stabilizers, etc., as described further herein.

As mentioned previously, the segmented polymer(s) (b), of the curable photochromic compositions of the present invention, includes active hydrogen groups. For example, at least one first segment and/or at least one second segment of each segmented polymer independently can include one or more active hydrogen groups.

The active hydrogen equivalent weight of the segmented polymer (b) generally is selected such that a cured article, such as a cured coating layer or cured polymeric film (or sheet), prepared from the curable photochromic compositions of the present invention, has desirable properties including, but not limited to, a desirable level of hardness, or desirable photochromic performance (such as reduced fade half-life ($T_{1/2}$) values).

The segmented polymer (b) can have an active hydrogen equivalent weight of less than or equal to 20,000 grams per equivalent (g/eq), such as less than 18,000 g/eq, or less than 15,000 g/eq. The segmented polymer (b) can have an active hydrogen equivalent weight of from 1,000 to 15,000 g/eq, or from 1,000 to 13,000 g/eq, or from 1,000 to 10,000 g/eq. Each active hydrogen group of the segmented polymer (b) independently is selected from hydroxyl (—OH), thiol (—SH), primary amine (—NH$_2$), or secondary amine (—NHR' or cyclic amine).

The R' group of each secondary amine group (—NHR') can be selected from any suitable organic group, such as a linear or branched $C_1$-$C_{20}$ alkyl group, cycloalkyl group, or aryl group, including those classes and examples thereof recited previously herein. The cyclic amines from which the secondary amine group can be selected include, but are not limited to, those represented by the following Formula (A):

(A)

With reference to Formula (A), subscript p is at least 3, such as 3, 4, 5, 6, or 7; and Y independently for each p is selected from —CH$_2$—, —CH(R")—, or —C(R")$_2$—, provided that one Y includes a single bond to the segmented polymer. Each R" can be selected from any suitable organic group, such as a linear or branched $C_1$-$C_{20}$ alkyl group, cycloalkyl group, or aryl group, including those classes and examples thereof recited previously herein. Examples of cyclic amine groups from which each secondary amine group of the segmented polymer can be independently selected, include, but are not limited to, azetidinyl, pyrrolidinyl, piperidinyl, azepanyl, and azoconyl.

Each active hydrogen group of the segmented polymer can be hydroxyl. The segmented polymer (b) can have a hydroxyl equivalent weight of less than or equal to 18,000 grams per equivalent (g/eq). For example, the segmented polymer can have a hydroxyl equivalent weight of from 1,000 to 15,000 g/eq, or from 1,200 to 13,000 g/eq, or from 1,500 to 11,000 g/eq. The hydroxyl equivalent weight of the segmented polymer can be calculated by dividing the mass of the resin solids by the difference between the sum of the moles of alcohol from the alcohol containing components and the sum of the moles of isocyanate from the isocyanate containing components.

Each first segment (i) and each second segment (ii) of the segmented polymer (b) can be formed separately. Subsequently, the previously formed first segment(s) and previously formed second segment(s) are combined together (such as reacted together resulting in the formation of covalent bond(s) there-between) so as to form the segmented polymer of the curable photochromic compositions of the present invention. Alternatively, each first segment can be initially formed, and subsequently, each second segment can be formed by polymerization from (or off of) the backbone of the previously formed first segment(s).

With the segmented polymers of the curable photochromic compositions of the present invention, at least one first segment and at least one second segment are covalently bonded to each other by a linking group selected from the group consisting of a carboxylic acid ester linking group (—C(O)O—), a thioester linking group (—C(O)—S—), an amide linking group (—C(O)—N(R')—), a urethane linking group (—N(H)—C(O)—O—), a thiourethane linking group (—N(H)—C(O)—S—), a urea linking group (—N(R')—C(O)—N(R')—), a thiourea linking group (—N(R')—C(S)—N(R')—), a carbonate linking group (—O—C(O)—O—), an ether linking group (—O—), and a thioether linking group (—S—). Each $R^1$ group of the above recited linking groups can each be independently selected from hydrogen or any suitable organic group, such as a linear or branched $C_1$-$C_{20}$ alkyl group, cycloalkyl group, or aryl group, including those classes and examples thereof recited previously herein.

Generally, each second segment is covalently bonded to at least one first segment. The segmented polymers of the curable photochromic compositions of the present invention are free of gelation (are not gelled). Further, at least one first segment and at least one second segment, of the segmented polymer (b), can be covalently bonded (or linked) to each other by a multifunctional linking group, such as a difunctional linking group. Each functional group of the multifunctional linking group can be selected from a precursor of a linking group described above. For purposes of non-limiting illustration, an isocyanate functional group (—NCO) is a precursor of a linking group, such as but not limited to a urethane linking group (—N(H)—C(O)—O—), a thiourethane linking group (—N(H)—C(O)—S—), or a urea linking group (—N(H)—C(O)—N($R^1$)—), where $R^1$ is selected from hydrogen and any suitable organic group, such as described previously herein.

For purposes of non-limiting illustration, a difunctional linking group (such as, but not limited to, a diisocyanate, or dicarboxylic acid, or dicarboxylic acid ester, or dihaloformate functional linking group) and an active hydrogen functional second segment (such as a hydroxy functional second segment) can be reacted together, such that the second segment includes at least one functional group of the difunctional linking group. For purposes of further non-limiting illustration, a diisocyanate functional linking group and a di-hydroxy functional second segment (or second segment precursor) can be reacted together with a functional ratio of isocyanate groups to hydroxyl groups of 1.1:1 to 3:1, or 1.5:1 to 2:1. The resulting isocyanate functionalized second segment can then be reacted together with an active hydrogen functional first segment, so as to form a segmented polymer according to the present invention. For purposes including, but not limited to, controlling molecular weight and/or crosslinking, prior to reaction together with the active hydrogen functional first segment, at least a portion of (e.g., 1% to 60%, or 30% to 50%) the isocyanate groups of the isocyanate functionalized second segment can be capped (or blocked) with a capping agent (such as one or more of the capping agents recited further herein with regard to the capped polyisocyanate curing agent). Further alternatively, prior to (and/or during) reaction together with the di-hydroxy functional second segment, at least a portion of (e.g., 1% to 50%, or 30% to 60%) the isocyanate groups of the diisocyanate functional linking group can be capped with a capping agent.

Without intending to be bound by any theory, it is believed that a cured coating layer or a cured film, prepared from the curable photochromic compositions of the present invention, includes domains that are composed substantially of second segments, which can be referred to herein as "second segment domains". It is further believed, without intending to be bound by an theory, that at least some (e.g., at least a major amount) of the photochromic compounds, of the curable photochromic compositions of the present invention, reside within the second segment domains of the cured coatings or films. It is additionally believed, without intending to be bound by any theory, that photochromic compounds residing within the second segment domains have an enhanced range of molecular freedom/motion, which allows the photochromic compounds to more easily and quickly transition between open and closed forms, such as in response to exposure to and removal of a source of actinic radiation, thus resulting in enhanced photochromic performance properties associated with the cured article.

The segmented polymer (b) can, with some embodiments, be present in the curable photochromic composition of the present invention in an amount of from 20 to 98 percent by weight, or from 30 to 98 percent by weight, or from 40 to 98 percent by weight, or from 35 to 80 percent by weight, in each case based on total weight of resin solids of the curable photochromic composition.

As used herein, the term "total weight of resin solids" means the total weight of the segmented polymer and the curing agent, and does not include the weight of the photochromic compound(s).

The curable photochromic compositions of the present invention include a curing agent (c) that includes reactive functional groups that are reactive with the active hydrogen groups of the segmented polymer (b), in which the curing agent includes at least one of, a polyisocyanate, a polyisothiocyanate, or an aminoplast.

The polyisocyanate curing (or crosslinking) agent includes at least two isocyanate groups (—NCO). Examples of isocyanate functional materials from which the polyisocyanate curing agent can be selected can include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl) fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; norbornane diisocyanate; and mixtures thereof.

The polyisocyanate curing agent can be selected from polyisocyanates prepared from dimers and trimers of diisocyanate monomers. Dimers and trimers of diisocyanate monomers can be prepared by art-recognized methods, such as described in U.S. Pat. No. 5,777,061 at column 3, line 44 through column 4, line 40. Dimers and trimers of the above recited diisocyanate monomers can contain linkages selected from the group consisting of isocyanurate, uretdione, biuret, allophanate and combinations thereof.

The polyisocyanate curing agent also can be selected from an oligomeric polyisocyanate functional adduct. The oligomeric polyisocyanate functional adduct can contain structural linkages selected from urethane (—NH—C(O)—O—), thiourethane (—NH—C(O)—S—), urea (—N($R^1$)—C(O)—N($R^1$)—, where each $R^1$ is independently as described previously herein), or combinations of such structural linkages.

As used herein, by "oligomeric polyisocyanate functional adduct" is meant a material that is substantially free of polymeric chain extension. Oligomeric polyisocyanate functional adducts can be prepared by art-recognized methods, for example, from a compound containing three or more active hydrogen groups, such as trimethylolpropane (TMP), and an isocyanate monomer, such as 1-isocyanato-3,3,5-trimethyl-5-isocyanatomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared ("TMP-3IPDI").

The active hydrogen group containing compound, used to prepare the oligomeric polyisocyanate functional adduct, can be aliphatic, such as TMP, trishydroxyisocyanurate, pentaerythritol, and trimethylolpropane tris(mercaptoacetate). The isocyanate monomer used to prepare the oligomeric polyisocyanate functional can be a diisocyanate monomer, for example, any of those described previously herein.

The isocyanate groups of the polyisocyanate curing agent can be capped or blocked with a capping/blocking agent. After exposure to elevated temperature, the capping/blocking agent separates from the isocyanate functional material, allowing the free/unblocked isocyanate groups thereof to react and form covalent bonds with the active hydrogen groups of the segmented polymer. After unblocking or decapping from the polyisocyanate, the capping agent can volatize out of the composition (prior to the composition becoming vitrified) and/or remain in the composition, such as a plasticizer. It is desirable that the capping agent not form bubbles in the composition and/or overly plasticize the composition after decapping.

The capping groups of the capped polyisocyanate curing agent can be selected from hydroxy functional compounds, 1H-azoles, lactams, ketoximes, or mixtures thereof. Classes of hydroxy functional compounds can include, but are not limited to, aliphatic, cycloaliphatic, or aromatic alkyl mono-alcohols or phenolics. Specific examples of hydroxy functional compounds useful as capping agents, include, but are not limited to, lower aliphatic alcohols such as methanol, ethanol, and n-butanol; cycloaliphatic alcohols such as cyclohexanol and tetrahydrofuran; aromatic-alkyl alcohols, such as phenyl carbinol and methylphenyl carbinol; and glycol ethers, e.g., ethylene glycol butyl ether, diethylene glycol butyl ether, ethylene glycol methyl ether and propylene glycol methyl ether. The hydroxy functional capping groups can include phenolics, examples of which include, but are not limited to, phenol itself and substituted phenols, such as cresol, nitrophenol and p-hydroxy methylbenzoate.

Examples of 1H-azoles that are useful as capping groups can include, but are not limited to, 1H-imidazole, 1H-pyrazole, 1H-dialkyl pyrazoles (such as, 1H-3,5-dimethyl pyrazole and 1H-2,5-dimethyl pyrazole), 1H-1,2,3-triazole, 1H-1,2,3-benzotriazole, 1H-1,2,4-triazole, 1H-5-methyl-1,2,4-triazole, and 1H-3-amino-1,2,4-triazole.

Ketoximes useful as capping groups can include those prepared from aliphatic or cycloaliphatic ketones. Examples of ketoxime capping groups include, but are limited to, 2-propanone oxime (acetone oxime), 2-butanone oxime (also referred to as, methylethyl ketoxime), 2-pentanone oxime, 3-pentanone oxime, 3-methyl-2-butanone oxime, 4-methyl-2-pentanone oxime, 3,3-dimethyl-2-butanone oxime, 2-heptanone oxime, 3-heptanone oxime, 4-heptanone oxime, 5-methyl-3-heptanone oxime, 2,6-dimethyl-4-heptanone oxime, cyclopentanone oxime, cyclohexanone oxime, 3-methylcyclohexanone oxime, 3,3,5-trimethylcyclohexanone oxime, and 3,5,5-trimethyl-2-cyclohexene-5-one oxime.

Examples of lactam capping groups can include, but are not limited to, e-caprolactam and 2-pyrolidinone. Other suitable capping groups include, morpholine, 3-aminopropyl morpholine, and N-hydroxy phthalimide.

In the curable photochromic compositions of the present invention, at least some of the reactive functional groups of the curing agent can be blocked with a capping group, and each capping group can be independently selected from the group consisting of methylethyl ketoxime, pyrazole (more particularly, 1H-pyrazole), and dialkyl pyrazole (more particularly, 1H-dialkyl pyrazole).

The polyisothiocyanate curing (or crosslinking) agent, of the curable photochromic compositions of the present invention, includes at least two isothiocyanate groups (—NCS). The polyisothiocyanate curing agent can be selected from those classes and examples of polyisocyanate curing agents described previously herein (including those in which the isocyanate groups are capped or blocked), in which the isocyanate groups (—NCO) thereof are replaced with isothiocyanate groups (—NCS).

The curable photochromic composition of the present invention usually also includes one or more cure catalysts for catalyzing the reaction between the isocyanate groups and/or isothiocyanate groups of the polyisocyanate curing agent and/or polyisothiocyanate curing agent and the active hydrogen groups of the segmented polymer. Classes of useful catalysts include, but are not limited to, metal compounds, such as, but not limited to, organic tin compounds, organic bismuth compounds, organic zinc compounds, organic zirconium compounds, organic aluminum compounds, organic nickel compounds, organic mercury compounds, and alkali metal compounds; and amine compounds, such as tertiary amine compounds, and quaternary ammonium compounds. Examples of organic tin compounds include, but are not limited to, tin(II) salts of carboxylic acids, such as, tin(II) acetate, tin(II) octanoate, tin(II) ethylhexanoate and tin(II) laurate; tin(IV) compounds, such as, dibutyltin oxide, dibutyltin dichloride, dibutyltin diacetate, dibutyltin dilaurate, dibutyltin maleate and dioctyltin diacetate. Examples of suitable tertiary amine catalysts include, but are not limited to, diazabicyclo[2.2.2] octane and 1,5-diazabicyclo[4,3,0]non-5-ene. Examples of organic bismuth compounds include, but are not limited to, bismuth carboxylates. Examples of alkali metal compounds include, but are not limited to, alkali metal carboxylates, such as, but not limited to, potassium acetate, and potassium 2-ethylhexanoate. Examples of quaternary ammonium compounds include, but are not limited to, N-hydroxyalkyl quaternary ammonium carboxylates. The catalyst can be selected from tin(II) octanoate, dibutyltin(IV) dilaurate, and/or bismuth 2-ethylhexanoate.

The curing (or crosslinking) agent of the curable photochromic compositions of the present invention can be an aminoplast curing agent. The aminoplast curing agent can be selected from art-recognized aminoplast curing agents (or crosslinkers). Examples of suitable aminoplast curing agents include, but are not limited to, aminoplasts containing methylol and/or methylol ether groups.

Aminoplasts are typically obtained from the reaction of formaldehyde with an amine or amide. Examples of amines or amides include, but are not limited to, melamine, urea, and/or benzoguanamine. Condensates with other amines or amides can also be used, such as, aldehyde condensates of glycoluril, which give a high melting crystalline product which is useful in powder coatings. While formaldehyde is typically used to prepare aminoplast crosslinking agents, other aldehydes can be used, such as acetaldehyde, crotonaldehyde, and/or benzaldehyde.

The aminoplast curing agents typically contain methylol groups. At least a portion of these methylol groups typically are etherified with an alcohol to modify the cure response. Any monohydric alcohol may be employed for this purpose, examples of which include, but are not limited to, methanol, ethanol, butanol, isobutanol, and/or hexanol. The aminoplast curing agents can be selected from melamine-, urea-, and/or benzoguanamine-formaldehyde condensates etherified with an alcohol containing from one to four carbon atoms.

When an aminoplast curing agent is present, the curable photochromic compositions of the present invention typically include one or more catalysts to accelerate the cure of the aminoplast curing agent with the active hydrogen groups of the segmented polymer. Suitable catalysts for aminoplast cure include, but are not limited to, acids such as acid phosphates and sulfonic acids or substituted sulfonic acids. Examples include dodecylbenzene sulfonic acid, paratoluene sulfonic acid, phenyl acid phosphate, ethylhexyl acid phosphate, and the like. The catalyst typically is present in an amount of about 0.05 to about 5.0 percent by weight, or about 0.25 to about 2.0 percent by weight, based on the total weight of resin solids in the curable photochromic composition.

The curing (or crosslinking) agent (c) can be present in the curable photochromic composition of the present invention in an amount of from 2 to 80 percent by weight, or from 2 to 70 percent by weight, or from 2 to 60 percent by weight, or from 20 to 65 percent by weight, the percent weights in each case being based on total weight of resin solids of the curable photochromic composition, and inclusive of the recited values.

The segmented polymer (b) can be present in the curable photochromic composition in an amount of from 30 to 98 percent by weight, based on total resin solids weight of the curable photochromic composition; and the curing agent can be present in the curable photochromic composition, with some embodiments, in an amount of from 2 to 70 percent by weight, based on total resin solids weight of the curable photochromic composition.

The curable photochromic composition of the present invention can comprise a curing agent which includes at least one of polyisocyanate and the polyisothiocyanate, where each reactive functional group of the curing agent is independently selected from isocyanate or isothiocyanate. The molar ratio of reactive functional groups of the curing agent (c) to active hydrogen groups of the segmented polymer (b) can be at least 4:1.

Further, the curing agent can include at least one of polyisocyanate and/or polyisothiocyanate, where each reactive functional group of the curing agent is independently selected from isocyanate or isothiocyanate. The molar ratio of reactive functional groups of the curing agent (c) to active hydrogen groups of the segmented polymer (b) is at least 5:1 and less than or equal to 60:1, such as from 6:1 to 50:1, or from 7:1 to 40:1.

The polyisocyanate suitable for use in the curable composition of the present invention can include at least one of linear or branched aliphatic polyisocyanates, cycloaliphatic polyisocyanates, dimers thereof, and trimers thereof, in each case including, but not limited to, those classes and examples thereof as described previously herein. Examples of linear or branched aliphatic polyisocyanates include, but are not limited to, ethylene diisocyanate; tetramethylene-1,4-diisocyanate; hexamethylene-1,6-diisocyanate; 2,2,4-trimethyl hexane-1,6-diisocyanate; and dodecane-1,12-diisocyanate. Examples of cycloaliphatic polyisocyanates include, but are not limited to, cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; and perhydrodiphenylmethane-4,4'-diisocyanate.

The curable photochromic compositions of the present invention also include (a) at least one photochromic compound. The photochromic compound (a) can be selected from known classes and examples of photochromic compounds, and can include combinations or mixtures thereof.

For example, although not limiting herein, mixtures of photochromic compounds can be used to attain certain activated colors, such as a near neutral gray or near neutral brown. See, for example, U.S. Pat. No. 5,645,767, col. 12, line 66 to col. 13, line 19, which describes the parameters that define neutral gray and brown colors and which disclosure is specifically incorporated by reference herein.

The photochromic compound suitable for use in the curable photochromic compositions of the present invention, can be selected from the group consisting of naphthopyrans, benzopyrans, phenanthropyrans, indenonaphthopyrans, spiro(indoline)naphthoxazines, spiro(indoline)pyridobenzoxazines, spiro(benzindoline)pyridobenzoxazines, spiro(benzindoline)naphthoxazines, spiro(indoline)-benzoxazines, fulgides, fulgimides, diarylethenes, and mixtures of such photochromic compounds.

Further examples of other photochromic compounds that can be used in curable photochromic compositions of the present invention include, but are not limited to, those disclosed at column 34, line 20 through column 35, line 13 of U.S. Pat. No. 9,028,728 B2, which disclosure is specifically incorporated by reference herein.

The photochromic compound (a) is present in the curable photochromic composition in an amount at least sufficient so as to provide an article prepared from the composition with a desirable level of photochromic properties, which is referred to as a photochromic amount. The amount of photochromic compound(s) present in the curable photochromic composition can range from 0.001 percent by weight to 40 percent by weight, or from 0.001 to 10 percent by weight, or from 0.01 to 5 percent by weight, or from 0.1 to 2.5 percent by weight, based on the total solids weight of curable photochromic composition (including the weight of the photochromic compound(s), and inclusive of the recited values).

The curable photochromic compositions of the present invention optionally can contain additives such as, but not limited to, waxes for flow and wetting; flow control agents, such as poly(2-ethylhexyl)acrylate; antioxidants; and ultraviolet (UV) light absorbers. Examples of useful antioxidants and UV light absorbers include, but are not limited to, those available commercially from BASF under the trademarks IRGANOX and TINUVIN. These optional additives, when used, can be present in amounts up to 20 percent by weight, based on total solids weight of the curable photochromic composition (excluding solvent).

The curable photochromic compositions of the present invention can further include one or more fixed-tint dyes. As used herein, the term "fixed-tint dye" and related terms, such as "fixed-colorant", "static colorant", "fixed dye", and "static dye" means dyes that are non-photosensitive materials, which do not physically or chemically respond to electromagnetic radiation with regard to the visually observed color thereof. The term "fixed-tint dye" and related terms as used herein does not include and is distinguishable from photochromic compound. As used herein, the term "non-photosensitive materials" means materials that do not physically or chemically respond to electromagnetic radiation with regard to the visually observed color thereof, including, but not limited to, fixed-tint dyes.

One or more fixed-tint dyes can be present in the curable photochromic compositions of the present invention for purposes including, but not limited to, providing a cured article prepared from the curable photochromic compositions with at least a base (or first) color characteristic of the fixed-tint dye, when the photochromic compound is not activated; and optionally a second color characteristic of the combination of the fixed-tint dye and the photochromic compound when activated, such as by exposed to actinic radiation.

The optional fixed-tint dye of the curable photochromic composition comprises at least one of azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, or polyene dyes.

The fixed-tint dye can be present in the curable photochromic composition in varying amounts to provide the intended effect in the cured article prepared therefrom. For example, the fixed-tint dye can be present in the curable photochromic composition in an amount of from 0.001 to 15 percent by weight, or from 0.01 to 10 percent by weight, or from 0.1 to 2.5 percent by weight, the percent weights in each case being based on the total solids weight of the curable photochromic composition (including the weight of the fixed-tint dye; and inclusive of the recited values).

The curable photochromic compositions of the present can include solvents such as those selected from water, organic solvents, and combinations thereof.

Classes of organic solvents that can be present in the curable photochromic compositions of the present invention include, but are not limited to, alcohols, such as methanol, ethanol, n-propanol, iso-propanol, n-butanol, sec-butyl alcohol, tert-butyl alcohol, iso-butyl alcohol, furfuryl alcohol and tetrahydrofurfuryl alcohol; ketones or ketoalcohols, such as acetone, methyl ethyl ketone, and diacetone alcohol; ethers, such as dimethyl ether and methyl ethyl ether; cyclic ethers, such as tetrahydrofuran and dioxane; esters, such as ethyl acetate, ethyl lactate, ethylene carbonate and propylene carbonate; hydroxy functional ethers of alkylene glycols, such as butyl 2-hydroxyethyl ether, methyl 2-hydroxypropyl ether and phenyl 2-hydroxypropyl ether; nitrogen containing cyclic compounds, such as pyrrolidone, N-methyl-2-pyrrolidone and 1,3-dimethyl-2-imidazolidinone; sulfur containing compounds, such as dimethyl sulfoxide and tetramethylene sulfone; aromatic compounds, such as toluene, xylene, anisole, and butyl benzoate; and mixtures of aromatic compounds, such as, but not limited to, Aromatic 100 Fluid, which is a commercially available mixture of $C_9$-$C_{10}$ dialkyl- and trialkyl-benzenes.

Solvent(s) can be present in the curable photochromic compositions of the present invention in an amount of from 5 to 95 percent by weight, or from 15 to 80 percent by weight, or from 30 to 60 percent by weight, in each case based on the total weight of the curable photochromic composition (including the weight of the solvent).

The present invention also relates to articles and, in particular, photochromic articles that are prepared using the curable photochromic composition of the present invention as described previously herein. Examples of photochromic articles that can be prepared using the curable photochromic compositions of the present invention, can include, but are not limited to, ophthalmic articles, display articles, windows, and mirrors.

The curable photochromic compositions of the present invention can be used to prepare photochromic layers, such as photochromic coating layers and photochromic films (or sheets). As used herein, the term "coating" means a cured layer that is not self-supporting, which generally is formed from a liquid composition which is applied to and adherent to a substrate, and which may or may not have a uniform thickness. As used herein, the term "film" (or "sheet") means a cured polymeric layer that is self-supporting (i.e., freestanding) and which has a substantially uniform thickness.

The curable photochromic composition of the present invention can be cured by any suitable method. The curable photochromic composition can be cured at ambient conditions, such as at room temperature of about 25° C. Alternatively, the curable photochromic composition can be cured by exposure to elevated temperature (in excess of ambient room temperature). As used herein, by "cured" is meant a three dimensional crosslink network is formed by covalent bond formation, such as between the active hydrogen groups of the segmented polymer and the reactive functional groups of the curing agent. When cured at elevated temperature, the curable photochromic composition can be referred to herein as a thermosetting curable photochromic composition. The temperature at which the thermosetting curable photochromic composition of the present invention is cured is variable and depends in part on the amount of time during which curing is conducted. The curable photochromic composition of the present invention can be cured at an elevated temperature of from 90° C. to 204° C., or from 100° C. to 177° C., or from 110° C. to 140° C. for a period of 20 to 240 minutes.

The present invention also relates to an article, such as a photochromic article, that comprises (A) a substrate; and (B) a photochromic layer over at least one surface of the substrate, wherein the photochromic layer is formed from any of the aforementioned curable photochromic compositions of the present invention.

The article, that includes a substrate, and a photochromic layer over at least one surface of the substrate (formed from the curable photochromic composition of the present invention) can be selected from ophthalmic articles, display articles, windows, or mirrors. Correspondingly, the substrate of the article can be selected from ophthalmic substrates, displays, windows, or mirrors. The substrate can be composed of one or more suitable materials, including, but not limited to, organic materials, such as organic polymeric materials; glasses, such as silica-based glasses; metals; ceramic materials; and combinations thereof.

Non-limiting examples of organic materials that can be used to form the substrate of the articles of the present invention include polymeric materials, for example, homopolymers and/or copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly (ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The substrate optionally can include a photochromic material and/or a fixed-tint dye, which can each be selected from those classes and examples of photochromic materials and fixed-tint dyes as described previously herein. The optional photochromic material(s)/compound(s) present in the substrate can be the same or different than the photochromic compound(s) of the photochromic layer. The optional fixed-tint dye(s) can be the same or different than the optional fixed-tint dye(s) of the photochromic layer.

The photochromic layer of the article can be a photochromic coating and/or a photochromic film (or sheet). The photochromic film or sheet can be formed in accordance with art-recognized methods, such as, but not limited to, extrusion and casting methods. The photochromic layer of the article can be a photochromic coating layer formed from the curable photochromic composition of the present invention. The curable photochromic coating composition can be applied to the substrate in accordance with art-recognized methods, which include, but are not limited to, spray application methods, curtain coating application methods, drawdown blade (or bar) application methods, dip-coating application methods, spin-coating application methods, jet printing methods (such as inkjet printing methods, where the "ink" is replaced with a curable photochromic composition according to the present invention), and combinations thereof.

After application of the curable photochromic composition over at least one surface of the substrate, the applied curable photochromic coating composition is cured, such as described previously herein to form a photochromic coating layer. The photochromic coating layer can be in the form of a single layer or multiple layers. When in the form of multiple layers, each layer of the photochromic layer can be prepared from curable photochromic compositions according to the present invention, having the same or different compositions, such as the same or different photochromic compound(s).

The photochromic layer can have any suitable thickness, such as from 10 micrometers to 250 micrometers, or from 15 micrometers to 75 micrometers.

In addition to the photochromic layer, the article optionally can include one or more further art-recognized layers, such as, but not limited to, a primer layer(s); an adhesive layer(s); a protective layer(s) (such as a hard-coat layer); a polarizing layer(s); a birefringent layer(s); an antireflective layer(s); and/or another photochromic layer(s) that is prepared from a composition other than the curable photochromic composition of the present invention.

The present invention further relates to a photochromic multilayer article comprising at least one photochromic layer formed from the curable photochromic composition of the present invention. Each layer of the photochromic multilayer article can independently be in the form of a coating or in the form of a film/sheet. The photochromic multilayer article can include two or more layers that are formed from the same or different curable photochromic compositions of the present invention.

The multilayer article of the present invention optionally can include one or more further art-recognized layers, such as, but not limited to, an adhesive layer(s); a protective layer(s) (such as a hard-coat layer or one or more polymeric film layers) a polarizing layer(s); a birefringent layer(s); an antireflective layer(s); and/or another photochromic layer(s) that is prepared from a composition other than the curable photochromic composition of the present invention.

The multilayer article of the present invention can have any suitable thickness, such as from 10 micrometers to 1,000 micrometers, or from 15 micrometers to 750 micrometers, or from 25 to 100 micrometers.

The multilayer article of the present invention can be used alone or in conjunction with another article, such as a substrate. The substrate can be selected from those classes and examples of substrates as described previously herein with regard to the article of the present invention, such as ophthalmic substrates, displays, windows, and/or mirrors. The substrate can be composed of one or more suitable materials, including, but not limited to, organic materials, such as organic polymeric materials; glasses, such as silica-based glasses; metals; ceramic materials; and combinations thereof.

The multilayer article of the present invention can be adhered to a surface of a substrate by art-recognized methods, such as, but not limited to, static clinging, such as with static electricity; one or more interposed adhesive layers; fusion bonding, such as thermal fusion bonding; and in-mold formation, such as where the multilayer article is placed in a mold, and the substrate is formed against at least one surface of the multilayer article within the mold. The multilayer article of the present invention can be supported by one or more brackets that engage retainingly with one or more peripheral regions of the multilayer article.

The present invention can be further characterized by one or more of the following non-limiting clauses.

Clause 1. A curable photochromic composition comprising:
(a) a photochromic compound;
(b) a segmented polymer comprising active hydrogen groups, at least one first segment, and at least one second segment, wherein:
  (i) each first segment independently comprises a fluorinated polymer segment, and
  (ii) each second segment independently comprises a segment selected from the group consisting of a polycarbonate segment, a polyester segment, a polyether segment, a polyurethane segment, and a segment of copolymers thereof; and
(c) a curing agent comprising reactive functional groups that are reactive with the active hydrogen groups of the segmented polymer, wherein the curing agent comprises at least one of a polyisocyanate, a polyisothiocyanate, or an aminoplast.

Clause 2. The curable photochromic composition of clause 1, wherein at least a portion of each second segment (ii) is terminated with a group derived from an active hydrogen-containing compound selected from the group consisting of 1H-azoles, alkyl alcohols, and mixtures thereof.

Clause 3. The curable photochromic composition of clauses 1 or 2, wherein:
the segmented polymer (b) has an active hydrogen equivalent weight of from 1,000 to 15,000 g/eq, and
each active hydrogen group of the segmented polymer (b) is independently selected from the group consisting of hydroxyl groups, thiol groups, primary amine groups, and secondary amine groups.

Clause 4. The curable photochromic composition of any one of clauses 1 to 3, wherein each active hydrogen group of the segmented polymer (b) is hydroxyl.

Clause 5. The curable photochromic composition of any one of clauses 1 to 4, wherein at least one first segment (i) and at least one second segment (ii) are covalently bonded to each other by a linking group selected from the group consisting of a carboxylic acid ester linking group, a thio-ester linking group, an amide linking group, a urethane linking group, a thiourethane linking group, a urea linking group, a thiourea linking group, a carbonate linking group, an ether linking group, and a thioether linking group.

Clause 6. The curable photochromic composition of any one of clauses 1 to 5, wherein the second segment (ii) is present in the segmented polymer (b) in an amount of from 40 percent by weight to 95 percent by weight, based on total weight of the segmented polymer.

Clause 7. The curable photochromic composition of any one of clauses 1 to 6, wherein the curable photochromic composition comprises a total amount of second segments (ii) of from 15 percent by weight to 50 percent by weight, based on total solids weight of the curable photochromic composition.

Clause 8. The curable photochromic composition of any one of clauses 1 to 7, wherein each second segment (ii) independently comprises at least one of a polycarbonate segment, a polycarbonate-polyester segment, a polycarbonate-polyurethane segment, a polyether segment, and/or a polycarbonate-polyester-polyurethane segment.

Clause 9. The photochromic composition of any one of clauses 1 to 8, wherein:
the curing agent (c) comprises at least one of a polyisocyanate comprising reactive isocyanate groups, and/or a polyisothiocyanate comprising reactive isothiocyanate groups, and
a molar ratio of reactive functional groups of the curing agent (c) to active hydrogen groups of the segmented polymer (b) is at least 4:1.

Clause 10. The curable photochromic composition of any one of clauses 1 to 9, wherein the molar ratio of reactive functional groups of the curing agent (c) to active hydrogen groups of the segmented polymer (b) is at least 5:1 and less than or equal to 60:1.

Clause 11. The curable photochromic composition of any one of clauses 1 to 10, wherein the curing agent (c) comprises a polyisocyanate, comprising reactive isocyanate groups.

Clause 12. The curable photochromic composition of clause 11, wherein the polyisocyanate is an aliphatic polyisocyanate, Clause 13. The curable photochromic composition of any one of clauses 1 to 12, wherein the curing agent (c) comprises a polyisocyanate and at least some of the reactive isocyanate groups comprising the polyisocyanate curing agent are blocked with a blocking agent, and each blocking agent is independently selected from the group consisting of methylethyl ketoxime, pyrazole, and dialkyl pyrazole.

Clause 14. The curable photochromic composition of any one of clauses 1 to 13, wherein the photochromic compound (a) is selected from the group consisting of naphthopyrans, benzopyrans, phenanthropyrans, indenonaphthopyrans, spiro(indoline)naphthoxazines, spiro(indoline)pyridobenzoxazines, spiro(benzindoline)pyridobenzoxazines, spiro(benzindoline)naphthoxazines, spiro(indoline)-benzoxazines, fulgides, fulgimides, and mixtures of such photochromic compounds.

Clause 15. The curable photochromic composition of any one of clauses 1 to 14, wherein the fluorinated polymer segment comprises an active hydrogen group.

Clause 16. A photochromic polymeric film comprising the curable photochromic composition of any one of clauses 1 to 15.

Clause 17. An article comprising:
(A) a substrate; and
(B) a photochromic layer over at least one surface of the substrate, wherein the photochromic layer is formed from the curable photochromic composition of any one of clauses 1 to 15.

Clause 18. A photochromic multilayer article comprising at least one photochromic layer formed from the curable photochromic composition of any one of clauses 1 to 15.

Clause 19. The photochromic multilayer article of clause 18, wherein the at least one photochromic layer is a photochromic coating layer and/or a photochromic polymeric film layer.

The present invention is more particularly described in the following examples, which are intended to be illustrative only, since numerous modifications and variations therein will be apparent to those skilled in the art. Unless otherwise specified, all parts and all percentages are by weight.

EXAMPLES

Part A: Preparation of Segmented Polymer Second Segment

The materials used in the preparation of polycarbonate-polyester diol segments are summarized in Table 1. Polycarbonate-polyester diol segments were each synthesized in a round bottom flask equipped with a mechanical stirrer and a Dean Stark trap. After introduction of Charge 1, each reaction mixture was heated under a nitrogen blanket to 170° C. giving a strong reflux. Xylenes and water were removed from the Dean Stark trap as needed to maintain the temperature to less than 180° C. for up to 7 hours, at which time the acid value was measured to be <1 mg KOH/g. At this point, the reaction mixture was cooled to 130° C. and then reduced to the solids level indicated in Table 1 by the addition of Charge 2.

TABLE 1

Preparation of segmented polymer second segments S-1 to S-6.

| | | Parts by Weight | | | | | |
|---|---|---|---|---|---|---|---|
| | Ingredients | S-1 | S-2 | S-3 | S-4 | S-5 | S-6 |
| Charge 1 | DURANOL ™ T5652[1] | 1735.9 | | 1814.3 | 1884.2 | | |
| | ETERNACOLL ® PH-200D[2] | | 754.0 | | | 1804.9 | 1710.7 |
| | Adipic acid | 98.4 | 46.1 | 102.8 | 106.8 | 102.3 | 103.2 |
| | Triphenyl phosphite | 3.6 | 1.6 | 3.8 | 3.9 | 3.8 | 3.7 |
| | Monobutyltin hydroxide oxide | 1.8 | 0.8 | 1.9 | 2.0 | 1.9 | 1.8 |
| | Aromatic 150 | 179 | 110.57 | 170 | 177 | 240.4 | 91 |
| | Xylenes | 200 | 118.5 | 208 | 216 | 280.8 | 221 |
| Charge 2 | Aromatic 150 | | 205.66 | 640 | 842 | 1359 | 1433 |
| | Anisole | 596 | | | | | |
| Product | Total solids (% by weight)[3] | 65 | 65.9 | 63.8 | 61.4 | 51.2 | 51 |
| | Number average molecular weight (Mn) | 10,800 | 12000 | 12,164 | 10,900 | 12,000 | 11,700 |

TABLE 1-continued

Preparation of segmented polymer second segments S-1 to S-6.

| | | Parts by Weight | | | | | |
|---|---|---|---|---|---|---|---|
| | Ingredients | S-1 | S-2 | S-3 | S-4 | S-5 | S-6 |
| | Polydispersity Index | 2.13 | 2.25 | 2.32 | 2.3 | 1.99 | 2.17 |
| | OH Value[4] | 10.3 | 9.4 | 9.9 | 9.9 | 8.5 | 7.2 |
| | Acid Value[5] | 0.1 | 0.2 | 0.1 | 0.3 | 0.2 | 0.2 |

[1]A polycarbonate diol from Asahi
[2]A polycarbonate diol from Ube
[3]% Solids measured after one hour in a 120° C. oven.
[4]OH value as determined by the method of ASTM D4274.
[5]Residual acidic material as determined by the method of ASTM D1639.

Part B: Preparation of Segmented Polymers

The preparation of segmented polymers (CE.1) through (Ex.8) are described as follows with reference to Table 2.

TABLE 2

Preparation of Segmented Polymers

| Charge | Ingredients | Samples (Parts by Weight of solution) | | | | | | | |
|---|---|---|---|---|---|---|---|---|---|
| | | CE.1 | Ex.2 | Ex.3 | Ex.4 | Ex.5 | Ex.6 | Ex.7 | Ex.8 |
| A | S-1 | 117.6 | 117.8 | | | | | | |
| | S-2 | | | 107.8 | | | | | |
| | S-3 | | | | 63.7 | | 119.1 | | |
| | S-4 | | | | | 111.3 | | | |
| | S-5 | | | | | | | 101.9 | |
| | S-6 | | | | | | | | 505.6 |
| B | TMDI[6] | 4.3 | 4.4 | 3.6 | 2.1 | 3.8 | 3.8 | 2.7 | 15.4 |
| C | Dibutyltindilaurate | 0.09 | 0.1 | 0.09 | 0.08 | | 0.1 | 0.09 | 0.34 |
| | KKat348[7] | | | | | 0.25 | | | |
| D | Tinuvin 152[8] | | | 6.4 | | 3.4 | 6.9 | 4.9 | |
| E | 1-Butanol | 0.76 | 0.77 | | 0.29 | 0.33 | | | 2.71 |
| F | (Meth)acrylic polyol[9] | 18.1 | | | | | | | |
| | LF916[10] | | 18.2 | | | | 16 | | |
| | LF916[11] | | | 9.5 | | | | | |
| | LF200[12] | | | | 63.9 | | | | |
| | LF9721[13] | | | | | 13.1 | | | |
| | LF910[14] | | | | | | | 46 | 93.5 |
| Product | % Solids[3] | 32 | 33 | 33 | 30 | 35 | 32 | 36 | 38 |
| | Weight average Molecular weight (Mw) | 62,000 | 87,400 | 145,000 | 233,000 | 92,300 | 135,000 | 66,700 | 78,000 |
| | PDI | 3.8 | 3.5 | 3.9 | 6.9 | 2.6 | 3.7 | 2.4 | 4 |
| | % Charge A and B | 87 | 81 | 82 | 53 | 85 | 78 | 61 | 81 |
| | OH equivalent weight[15] | 4200 | 4700 | 9200 | 2700 | 4400 | 4800 | 1700 | 5000 |

[6]A methyl-group branched diisocyanate (an approximate 1:1 mixture of 2,2,4-and 2,4,4-trimethyl-hexamethylene diisocyanate) from Evonik Industries with an NCO equivalent weight of 105.
[7]A bismuth carboxylate catalyst from King Industries.
[8]A hindered amine light stabilizer from BASF with an OH equivalent weight of 756.
[9]The (meth)acrylic polyol segment corresponds to the Acrylic polyol of Table 6 of WO 2017/030545 A1, and was prepared by free radical polymerization of hydroxypropyl methacrylate (40.4%), butyl methacrylate (57.6%), and acrylic acid (2.0%), and had: a total solids of 61.5% by weight; an Mn of 3920; a polydispersity index of 1.58; and a theoretical hydroxyl equivalent weight (on solids) of 360.
[10]Lumiflon ® fluoroethylene vinyl ether polyol available from Asahi Glass, sample used had an OH value of 96 and a % solids of 99%.
[11]Batch of Lumiflon ® LF916 with an OH value of 104 and a % solids of 99%.
[12]Lumiflon ® fluoroethylene vinyl ether polyol available from Asahi Glass, sample used had an OH value of 30.9 (solution) and a % solids of 60%.
[13]Lumiflon ® fluoroethylene vinyl ether polyol available from Asahi Glass, sample used had an OH value of 116 (solution) and a % solids of 70%.
[14]Lumiflon ® fluoroethylene vinyl ether polyol available from Asahi Glass, sample used had an OH value of 68 (solution) and a % solids of 66.2%.
[15]The OH equivalent weight was calculated by dividing the mass of the resin solids by the difference between the sum of the moles of alcohol from the alcohol containing charges (A, D, E and F) and the sum of the moles of the isocyanate from the isocyanate containing charge (B).

Segmented Polymer CE.1

According to Table 2 charge A, B and C were combined together along with Anisole (121 g) and heated at 80° C. for 2.5 hours. The sample was cooled to 75° C. and charge E in Anisole (16 g) was added. After 10 minutes charge F was added along with Anisole (5 g). After 30 minutes at 75° C. the temperature was increased to 80° C. for 3.5 hours. Testing with Surface SWYPE™ pads (available from CLI Laboratories Inc., a drop of reaction solution when placed on a pad causes a color change to orange or red when free isocyanates are present) indicated isocyanate was still present. 1-Propanol (2 mL) was added to quench the reaction and after 1.5 hours, testing with Surface SWYPE™ pads indicated isocyanate was not present and the solution was cooled to provide a viscous liquid.

Segmented Polymer Ex.2

According to Table 2 charges A, B and C were combined together along with Anisole (116 g) and heated at 80° C. for 2.5 hours. The sample was cooled to 70° C. and charge E in Anisole (13 g) was added. After 10 minutes charge F dissolved in Anisole (28 g) was added along with additional Anisole (8 g). After 30 minutes at 70° C. the temperature was increased to 80° C. for 2.5 hours. Testing with Surface SWYPE™ pads indicated isocyanate was not present and the solution was cooled to provide a viscous liquid.

Segmented Polymer Ex.3

According to Table 2 charges A, B and C were combined together along with Aromatic 150 (87 g) and heated at 80° C. for 2.5 hours. The sample was cooled to 75° C. and charge D dissolved in Aromatic 150 (27 g) was added. After 10 minutes charge F dissolved in Aromatic 150 (34 g) was added along with additional Aromatic 150 (8 g). After 30 minutes the temperature was increased to 80° C. for 2 hours. Testing with Surface SWYPE™ pads indicated isocyanate was not present and the solution was cooled to provide a viscous liquid.

Segmented Polymer Ex.4

According to Table 2 charges A, B and C were combined together along with m-Xylene (129 g) and heated at 80° C. for 2.5 hours. The sample was cooled to 70° C. and charge E in m-Xylene (14 g) was added. After 10 minutes charge F was added. After 60 minutes at 70° C. the temperature was increased to 85° C. for 1 hour. Testing with Surface SWYPE™ pads indicated isocyanate was not present and the solution was cooled to provide a viscous liquid.

Segmented Polymer Ex.5

According to Table 2 charges A, B and C were combined together along with Aromatic 150 (90 g) and heated at 80° C. for 2.5 hours. The sample was cooled to 75° C. and charge D dissolved in Aromatic 150 (11 g) along with additional Aromatic 150 (4 g) was added. After 30 minutes charge E in Aromatic 150 (7 g) was added. After 10 minutes charge F was added along with additional Aromatic 150 (11 g). After 30 minutes the temperature was increased to 80° C. for 2 hours. Testing with Surface SWYPE™ pads indicated isocyanate was not present and the solution was cooled to provide a viscous liquid.

Segmented Polymer Ex.6

According to Table 2 charges A, B and C were combined together along with Aromatic 150 (110 g) and heated at 80° C. for 2.5 hours. The sample was cooled to 75° C. and charge D dissolved in Aromatic 150 (10 g) along with additional Aromatic 150 (4 g) was added. After 30 minutes charge F dissolved in Aromatic 150 (24 g) was added along with additional Aromatic 150 (10 g). After 2.5 hours, testing with Surface SWYPE™ pads indicated isocyanate was still present. 1-Propanol (2 mL) was added to quench the reaction and after 30 minutes testing with Surface SWYPE™ pads indicated isocyanate was not present and the solution was cooled to provide a viscous liquid.

Segmented Polymer Ex.7

According to Table 2 charges A, B and C were combined together along with Aromatic 150 (41 g) and heated at 80° C. for 2.5 hours. The sample was cooled to 75° C. and charge D dissolved in Aromatic 150 (16 g) was added. After 30 minutes charge F dissolved in Aromatic 150 (9 g) was added. After 30 minutes the temperature was increased to 80° C. for 2 hours. Testing with Surface SWYPE™ pads indicated isocyanate was not present and the solution was cooled to provide a viscous liquid.

Segmented Polymer Ex.8

According to Table 2 charges A, B and C were combined together along with Aromatic 150 (251 g) and heated at 80° C. for 3 hours. The sample was cooled to 70° C. and charge E mixed with Aromatic 150 (6 g) was added. After 30 minutes charge F was added. After 2 hours testing with Surface SWYPE™ pads indicated isocyanate was not present and the solution was cooled to provide a viscous liquid.

Part C: Preparation of Photochromic Solution

Photochromic Solutions (A) and (B) were prepared by mixing the materials listed in Table 3 at ambient until all solids were observed to have dissolved.

TABLE 3

| Photochromic Solution | | |
|---|---|---|
| Component | Parts by weight | |
| Ingredients | A | B |
| Photochromic dyes[16] | 14.7 | 9.7 |
| TINUVIN 144[17] | 4.9 | 3.2 |
| IRGANOX 245[18] | 4.9 | 3.2 |
| Tamisolve ™ NxG[19] | 75.5 | 41.9 |
| Aromatic 150 | | 28.0 |
| Propylene Carbonate | | 14.0 |

[16]A blend of photochromic indenofused naphthopyran dyes selected so as to provide a green-gray color.
[17]A hindered amine light stabilizer from BASF: bis(1,2,2,6,6-pentamethyl-4-piperidinyl)-[[3,5-bis(1,1-dimethylethyl)-4-hydroxyphenyl]methyl]butylmalonate.
[18]An antioxidant from BASF: triethylene glycol bis(3-tert-butyl-4-hydroxy-5-methylphenyl)propionate.
[19]A solvent available from Eastman Preparation of Comparative and Inventive Curable Photochromic Compositions.

Comparative Curable Photochromic Compositions:

Comparative curable photochromic compositions (CE-9, CE-10) were prepared from the components listed in Table 4. CE-9 is a representative curable photochromic composition which uses a fluorinated polyol and polycarbonate diol segments added as individual components. CE-10 is representative of a curable photochromic composition which uses a segmented polymer composed of a (meth)acrylic polyol and polycarbonate-polyester diol segments.

TABLE 4

| Comparative Examples | | | |
|---|---|---|---|
| | Component | CE.9 | CE.10 |
| Charge 1 | ETERNACOLL ® PH-300D[20] | 32.0 | |
| | Segmented Polymer CE.1 | | 120.6 |
| | Photochromic Solution (A) | | 40.9 |
| | Photochromic Solution (B) | 61.9 | |
| | Tamisolve ™ NxG | | 19.7 |
| | TRIXENE ® BI-7960[21] | 91.3 | 87.4 |

TABLE 4-continued

Comparative Examples

| | Component | CE.9 | CE.10 |
|---|---|---|---|
| Charge 2 | γ-Glycidoxypropyl-trimethoxysilane | 4.5 | 4.5 |
| | K-KAT ® 348 | | 1.1 |
| | dibutyltindilaurate | 0.3 | |
| | BYK ® 333[22] | 0.08 | 0.08 |
| | LF910[14] | 6.3 | |

[20]A polycarbonate diol with a hydroxyl equivalent weight of 1,516, available from UBE Industries.
[21]A hexamethylene diisocyanate biuret, blocked with 3,5-dimethylpyrazole, available from Baxenden Chemical Co with an equivalent weight of 410.
[22]A polyether modified polydimethylsiloxane from BYK-Chemie, USA Curable Photochromic Composition Examples According to the Present Invention:

Inventive curable photochromic composition Examples 11 to 17 were prepared from the ingredients listed in Table 5. The examples were prepared according to the procedure described above for the comparative examples.

TABLE 5

| Ingredients | Ex. 11 | Ex.12 | Ex.13 | Ex.14 | Ex.15 | Ex.16 | Ex.17 |
|---|---|---|---|---|---|---|---|
| | Charge 1 Parts by Weight | | | | | | |
| Segmented Polymer Ex.2 | 126.9 | | | | | | |
| Segmented Polymer Ex.3 | | 124.9 | | | | | |
| Segmented Polymer Ex.4 | | | 189.2 | | | | |
| Segmented Polymer Ex.5 | | | | 113.8 | | | |
| Segmented Polymer Ex.6 | | | | | 135.3 | | |
| Segmented Polymer Ex.7 | | | | | | 146.4 | |
| Segmented Polymer Ex.8 | | | | | | | 177.0 |
| Photochromic Solution (A) | 40.8 | | | | | | |
| Photochromic Solution (B) | | 60.9 | 62.1 | 61.0 | 62.2 | 61.0 | 59.4 |
| Tamisolve ™ NxG | 17.6 | | | | | | |
| | Charge 2 Parts by Weight | | | | | | |
| TRIXENE ® BI-7960 | 83.2 | 84.5 | 62.9 | 86.0 | 81.0 | 65.7 | 46.8 |
| γ-Glycidoxypropyltrimethoxysilane | 4.5 | 4.5 | 4.5 | 4.5 | 4.5 | 4.5 | 4.3 |
| K-KAT ® 348 | 1.1 | 1.1 | 0.7 | 1.1 | 1.1 | 1.1 | 0.6 |
| BYK ® 333 | 0.08 | 0.08 | 0.08 | 0.08 | 0.08 | 0.08 | 0.08 |
| | Charge 3 Parts by Weight | | | | | | |
| Tamisolve ™ NxG | 25.1 | 43.5 | | 24.2 | 11.3 | | 9.0 |
| Aromatic 150 | | | | | | | 6.0 |
| Propylene Carbonate | | | | | | | 3.0 |
| | Product | | | | | | |
| % Charge A and B from Table 2 based on resin solids | 29.4 | 29.4 | 25.7 | 29.3 | 29.2 | 28.2 | 47.5 |
| NCO:OH ratio | 22.8 | 46.0 | 7.3 | 23.2 | 21.9 | 5.2 | 8.5 |

After their preparation, curable photochromic composition Examples 9 to 17 were each placed on a WHEATON® 348923-A Benchtop Roller for a minimum of six hours prior to use.

Part D: Preparation of Test Specimens.

Each of the curable photochromic composition examples prepared above in Part C was applied to a PDQ® coated GENTEX® polycarbonate plano lens (available from Gentex Optics, Inc.) having a diameter of 76 millimeters. All lens substrates were treated with oxygen plasma at a flow rate of 100 milliliters (mL) per minute of oxygen at 100 W of power for three minutes, then coated with each of the curable photochromic composition examples described in Part C, by spin coating. About 1-2 mL of each curable photochromic composition was dispensed onto the lens substrate, which was then rotated for 8-13 seconds at a spin speed sufficient to deposit enough wet coating onto the lens, so as to produce similar activated optical densities, as described below in Part E. The spin coating parameters are reported in Table 6.

TABLE 6

Spin Coating Parameters and Coating Weights Measured with Regard to the Preparation of Test Specimens.

| Example | Spin Time (sec) | Spin speed (rpm) | Photochromic coating weight (g) |
|---|---|---|---|
| CE.9 | 9 | 1256 | 0.27 |
| CE.10 | 10 | 1231 | 0.38 |
| Ex. 11 | 11 | 1334 | 0.42 |
| Ex. 12 | 11 | 1131 | 0.44 |
| Ex. 13 | 12 | 1428 | 0.39 |
| Ex. 14 | 11 | 1366 | 0.42 |
| Ex. 15 | 10 | 1615 | 0.41 |

TABLE 6-continued

Spin Coating Parameters and Coating Weights Measured with Regard to the Preparation of Test Specimens.

| Example | Spin Time (sec) | Spin speed (rpm) | Photochromic coating weight (g) |
|---|---|---|---|
| Ex. 16 | 8 | 867 | 0.40 |
| Ex. 17 | 13 | 1366 | 0.40 |

The coated lens substrates were prepared in duplicate and designated as "Lens Set A" and "Lens Set B". The coated lens substrates were then placed in a 40° C. oven until all coated lens substrates were accumulated. The 40° C. treated coated lens substrates were then cured in a forced air oven at 125° C. for one hour, and subsequently cooled to room temperature. The test specimens of Lens Set A were then subjected to an additional thermal cure for three hours at 105° C. and set aside for evaluation of hardness. The test specimens of Lens Set B were further treated with oxygen plasma as previously described and coated with HI-GARD© 1080S hard-coat, a protective coating available from PPG Industries, Inc. The HI-GARD® 1080S hard-coat was applied by spin coating, and then each lens (of Lens Set B) was further cured at 105° C. for three hours. The final lenses (test specimens) of Lens Set B were then evaluated for photochromic properties.

Part E: Test Methods and Test Results of the Test Specimens Prepared in Part D.

Test specimens of Lens Set A were subjected to microhardness testing using a Fischerscope HCV, Model H100SMC apparatus (available from Fischer Technology, Inc.) at a penetration depth of 2 microns after a 100 Newton load for 15 seconds. Each test specimen was measured from 2 to 5 times and the microhardness results were averaged, and are tabulated in Table 15.

The photochromic performance of the test specimens of Lens Set B was tested on the Bench for Measuring Photochromics ("BMP") made by Essilor, Ltd. France. The BMP was maintained at a constant temperature of 23° C. during testing. Prior to testing on the BMP, each of the test specimens was exposed to 365 nanometer (nm) ultraviolet light for about 10 minutes at a distance of about 14 centimeters, to activate the photochromic materials. The UVA (315 nm to 380 nm) irradiance at the test specimen was measured with a LICOR® Model Li-1800 spectroradiometer and found to be 22.2 Watt per meter squared (W/m²). Each test specimen was then placed under a 500 Watt (W), high intensity halogen lamp for about 10 minutes at a distance of about 36 centimeters to bleach (inactivate) the photochromic materials. The illuminance at the test specimen was measured with the LICOR® spectroradiometer and found to be 21.9 Klux. Each test specimen was then kept in a dark environment at room temperature (from 21° C. to 24° C.) for at least one hour prior to testing on the BMP. Prior to measurement, each test specimen was measured for ultraviolet absorbance at 390 nm.

The BMP was fitted with two 150W Newport Model #6255 Xenon arc lamps set at right angles to each other. The light path from Lamp 1 was directed through a 3 mm SCHOTT® KG-2 band-pass filter and appropriate neutral density filters that contributed to the required UV and partial visible light irradiance level. The light path from Lamp 2 was directed through a 3 mm SCHOTT® KG-2 band-pass filter, a SCHOTT® short band 400 nm cutoff filter, and appropriate neutral density filters in order to provide supplemental visible light illuminance. A 2 inch×2 inch (5.1 cm×5.1 cm) 50% polka dot beam splitter set at 450 to each lamp is used to mix the two beams. The combination of neutral density filters and voltage control of the Xenon arc lamp were used to adjust the intensity of the irradiance. Software (BMPSoft version 2.1e) was used on the BMP to control timing, irradiance, air cell and sample temperatures, shuttering, filter selection, and response measurement. A ZEISS® spectrophotometer, Model MCS 601 with fiber optic cables for light delivery through the lens, was used for response and color measurement. Photopic response measurements were collected on each test specimen.

The power output of the BMP (i.e., the dosage of light that the test specimen was exposed to) was adjusted to 6.7 W/m² UVA, integrated from 315-380 nm, and 50 Klux illuminance, integrated from 380-780 nm. Measurement of this power set-point was made using an irradiance probe and the calibrated Zeiss spectrophotometer. The lens (test specimen) sample cell was fitted with a quartz window and self-centering sample holder. The temperature in the sample cell was controlled at 23° C. through the software with a modified Facis, Model FX-10 environment simulator. Measurement of the dynamic photochromic response and color of the test specimen were made using the same Zeiss spectrophotometer with fiber optic cables for light delivery from a tungsten halogen lamp through the sample. The collimated monitoring light beam from the fiber optic cable was maintained perpendicular to the test sample while passing through the test specimen and directed into a receiving fiber optic cable assembly attached to the spectrophotometer. The exact point of placement of the test specimen in the sample cell was where the activating xenon arc beam and the monitoring light beam intersected to form two concentric circles of light. The angle of incidence of the xenon arc beam at the test specimen placement point was about 300 from perpendicular.

Response measurements, in terms of a change in optical density (ΔOD) from the unactivated (bleached) state to the activated (colored) state, were determined by establishing the initial unactivated transmittance then opening the shutter from the Xenon lamp(s) and measuring the transmittance through activation at selected intervals of time. ΔOD at saturation was the measured absorption after 15 minutes of exposure. Change in optical density was determined according to the formula: ΔOD=log 10(% Tb/% Ta), where % Tb is the percent transmittance in the bleached state and % Ta is the percent transmittance in the activated state. Optical density measurements were based on photopic optical density.

An Atlas Ci4000 weatherometer was used for conducting the simulated solar radiation accelerated weathering. The samples are exposed for a 1 hour dark cycle with the Black Panel and Chamber temperature at 40° C. and relative humidity of 45%. This was followed by a 65 hour light cycle using a boro/boro silicate filtered Xenon arc lamp with an output of 0.25 Watts per square meter at 340 nm. The temperature in the weatherometer was maintained at 40° C. and the relative humidity was controlled at 70% humidity. The temperature of the black panel was maintained at 55° C.

After the lenses underwent this UV exposure fatigue cycle, the lenses were preconditioned and measured on the optical bench to obtain the final $\Delta OD_{final}$ under the same conditions as described for the initial testing.

The percent fatigue was determined by measuring the difference between the change in optical density (ΔOD) of the test sample before and after accelerated weathering according to the formula: % Fatigue=$(\Delta OD_{init}-\Delta OD_{final})/\Delta OD_{init} \times 100$.

The results of the microhardness, Fade Half Life ($T_{1/2}$), ΔOD at saturation and photochromic dye fatigue testing are shown in Table 7. The ΔOD at saturation is after 15 minutes of activation. The Fade Half Life ($T_{1/2}$) value is the time interval in seconds for the ΔOD of the activated form of the photochromic material in the coating to reach one half the fifteen-minute ΔOD at 23° C. after removal of the activating light source. The fatigue testing is % remaining optical density after 130 hours of accelerated fatigue testing.

TABLE 7

Results of Coating Hardness, Photochromic Performance Testing and Fatigue

| Example | Fischer microhardness (N/mm$^2$) | T$_{1/2}$ @ Photopic (seconds) | ΔOD at saturation | % OD Loss |
|---|---|---|---|---|
| CE.9 | 27 | 86 | 0.92 | 40 |
| CE.10 | 34 | 71 | 0.91 | 81 |
| Ex.11 | 27 | 71 | 0.91 | 38 |
| Ex.12 | 27 | 74 | 0.90 | 20 |
| Ex.13 | 37 | 80 | 0.86 | 30 |
| Ex.14 | 27 | 71 | 0.92 | 27 |
| Ex.15 | 37 | 74 | 0.91 | 16 |
| Ex.16 | 22 | 79 | 0.88 | 32 |
| Ex.17 | 8 | 67 | 0.91 | 44 |

The test results as tabulated in Table 7 demonstrate that the curable photochromic compositions according to the present invention, which include fluorinated segmented polymer(s), provide cured photochromic layers having an improvement in at least one of the photochromic performance properties (such as reduced T$_{1/2}$ values, improved surface hardness, or improved photochromic dye fatigue) when compared to comparative curable photochromic compositions without segmented polymers and comparative compositions that include segmented polymers with no fluorinated components.

What is claimed is:

1. A curable photochromic composition comprising:
   (a) a photochromic compound;
   (b) a segmented polymer comprising active hydrogen groups, at least one first segment, and at least one second segment, wherein:
     (i) each first segment independently comprises a fluorinated polymer segment, and
     (ii) each second segment independently comprises a segment selected from the group consisting of a polycarbonate segment, a polyester segment, a polyether segment, a polyurethane segment, and a segment of copolymers thereof; and
   (c) a curing agent comprising reactive functional groups that are reactive with the active hydrogen groups of the segmented polymer, wherein the curing agent comprises at least one of a polyisocyanate, a polyisothiocyanate, or an aminoplast.

2. The curable photochromic composition of claim 1, wherein at least a portion of each second segment (ii) is terminated with a group derived from an active hydrogen-containing compound.

3. The curable photochromic composition of claim 1, wherein:
   the segmented polymer (b) has an active hydrogen equivalent weight of from 1,000 to 15,000 g/eq, and
   each the active hydrogen group of the segmented polymer (b) is independently selected from the group consisting of hydroxyl groups, thiol groups, primary amine groups, and secondary amine groups.

4. The curable photochromic composition of claim 1, wherein each the active hydrogen group of the segmented polymer (b) is hydroxyl.

5. The curable photochromic composition of claim 1, wherein the at least one first segment (i) and the at least one second segment (ii) are covalently bonded to each other by a linking group selected from the group consisting of a carboxylic acid ester linking group, a thioester linking group, an amide linking group, a urethane linking group, a thiourethane linking group, a urea linking group, a thiourea linking group, a carbonate linking group, an ether linking group, and a thioether linking group.

6. The curable photochromic composition of claim 1, wherein the second segment (ii) is present in the segmented polymer (b) in an amount of from 40 percent by weight to 95 percent by weight, based on total weight of the segmented polymer.

7. The curable photochromic composition of claim 1, wherein the curable photochromic composition comprises a total amount of the second segments (ii) of from 15 percent by weight to 50 percent by weight, based on total solids weight of the curable photochromic composition.

8. The curable photochromic composition of claim 1, wherein each the second segment (ii) independently comprises at least one of a polycarbonate segment, a polycarbonate-polyester segment, a polycarbonate-polyurethane segment, a polyether segment, or a polycarbonate-polyester-polyurethane segment.

9. The curable photochromic composition of claim 1, wherein:
   the curing agent (c) comprises the at least one of a polyisocyanate comprising reactive isocyanate groups, or a polyisothiocyanate comprising reactive isothiocyanate groups,
   and
   a molar ratio of reactive functional groups of the curing agent (c) to active hydrogen groups of the segmented polymer (b) is at least 4:1.

10. The curable photochromic composition of claim 1, wherein the molar ratio of reactive functional groups of the curing agent (c) to active hydrogen groups of the segmented polymer (b) is at least 5:1 and less than or equal to 60:1.

11. The curable photochromic composition of claim 1, wherein the curing agent (c) comprises the polyisocyanate, comprising reactive isocyanate groups.

12. The curable photochromic composition of claim 11, wherein the polyisocyanate is an aliphatic polyisocyanate.

13. The curable photochromic composition of claim 1, wherein the curing agent (c) comprises the polyisocyanate and at least some of the reactive isocyanate groups comprising the polyisocyanate curing agent are blocked with a blocking agent, and each blocking agent is independently selected from the group consisting of methylethyl ketoxime, pyrazole, and dialkyl pyrazole.

14. The curable photochromic composition of claim 1, wherein the photochromic compound (a) is selected from the group consisting of naphthopyrans, benzopyrans, phenanthropyrans, indenonaphthopyrans, spiro(indoline) naphthoxazines, spiro(indoline)pyridobenzoxazines, spiro (benzindoline)pyridobenzoxazines, spiro(benzindoline) naphthoxazines, spiro(indoline)-benzoxazines, fulgides, fulgimides, and mixtures of such photochromic compounds.

15. The curable photochromic composition of claim 1, wherein the fluorinated polymer segment comprises an active hydrogen group.

16. A polymeric film comprising the curable photochromic composition of claim 1.

17. An article comprising:
   (A) a substrate; and
   (B) a photochromic layer over at least one surface of the substrate, wherein the photochromic layer is formed from the curable photochromic composition of claim 1.

18. A photochromic multilayer article comprising at least one photochromic layer formed from the curable photochromic composition of claim 1.

* * * * *